United States Patent

[11] 3,548,080

[72] Inventor Hans Dobermann
Munich, Germany
[21] Appl. No. 866,773
[22] Filed Oct. 15, 1969
Continuation of Ser. No. 579,064, Sept. 13, 1966, abandoned.
[45] Patented Dec. 15, 1970
[73] Assignee Siemens Aktiengesellschaft
Munich, Germany
[32] Priority Sept. 15, 1965
[33] Germany
[31] No. S99,439

[54] CIRCUIT ARRANGEMENT FOR TELEPRINTER EXCHANGE SYSTEMS

5 Claims, 1 Drawing Fig.

[52] U.S. Cl. ........ 178/2, 178/4.1
[51] Int. Cl. ........ H04l 11/02
[50] Field of Search ........ 178/2, 4.1, (Inquired)

[56] References Cited
UNITED STATES PATENTS
2,652,446 9/1953 Oberman ........ 178/2

*Primary Examiner*—Donald J. Yusko
*Assistant Examiner*—Marshall M. Curtis
*Attorney*—Birch, Swindler, McKie and Beckett

ABSTRACT: In teleprinter dial exchanges wherein a connection between a subscriber circuit and a repeater or transmission system takes place over a path network formed by connection elements such as couplers, the converter circuit in the repeater is connected with the subscriber circuit over a single telegraph conductor over which all signals are transmitted in both directions. Repoling of the calling subscriber's circuit for message transmission is achieved over this single conductor by coordination of switching devices at the exchange and at the subscriber's circuit.

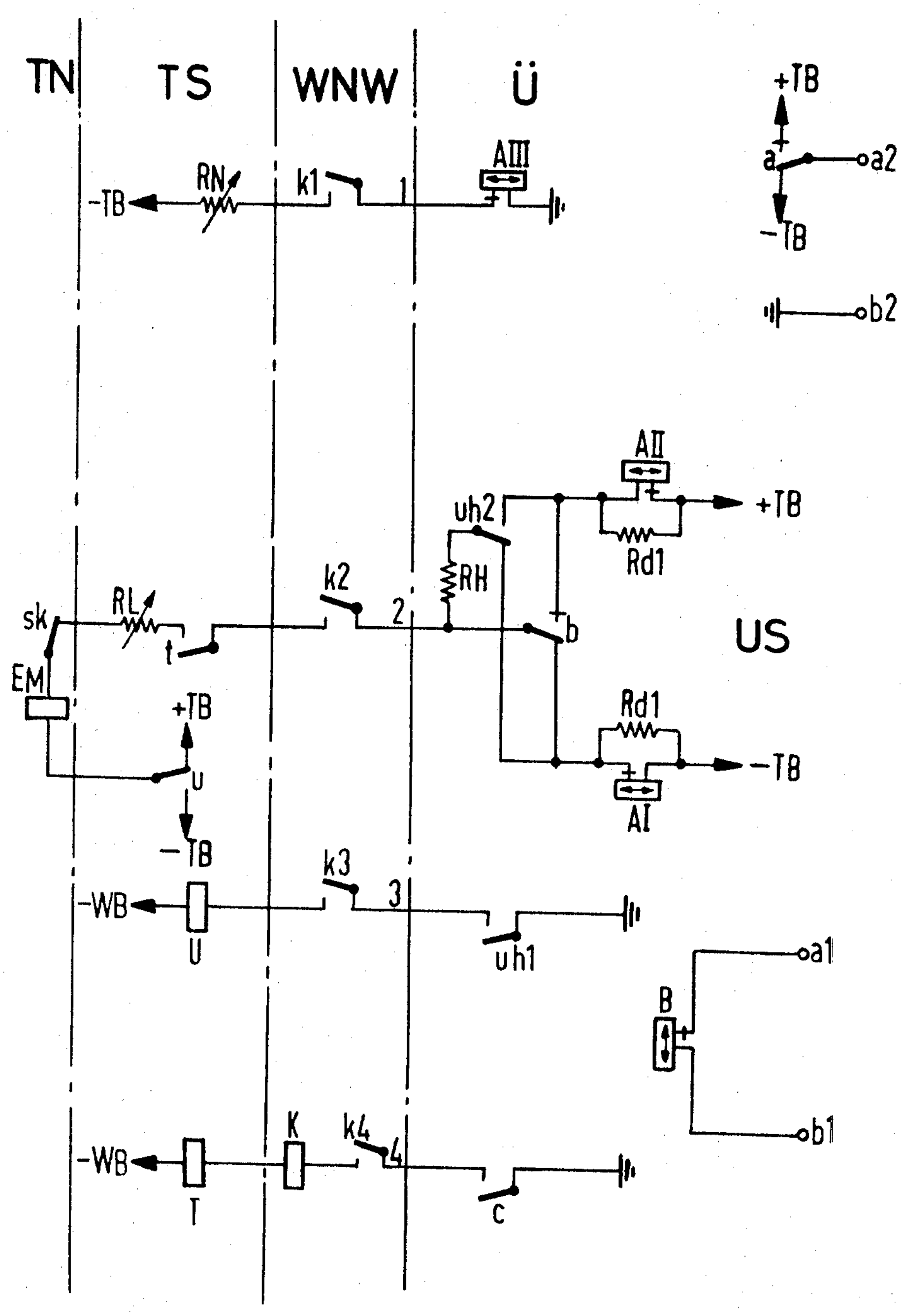
TN
TS
WNW
Ü
-TB
RN
k1
1
AIII
+TB
a
a2
-TB
b2
AII
uh2
+TB
Rd1
k2
RH
RL
sk
2
b
US
t
EM
+TB
u
Rd1
-TB
AI
-TB
k3
-WB
3
U
uh1
a1
B
b1
-WB
K
k4
4
T
c

CIRCUIT ARRANGEMENT FOR TELEPRINTER EXCHANGE SYSTEMS

This application is a continuation of application Ser. No. 579,064 filed Sept. 13, 1966 now abandoned.

This invention relates to teleprinter exchange systems providing for conversion of electrical signals and, more particularly, providing for conversion of simplex and duplex electrical signals. A simplex system is a well-known form of telegraphic service in which transmission of signals in a single line can be effected in one direction only at a given time. A duplex system, conversely, permits simultaneous transmission in opposite directions through a single transmission line without interference. In the following description of the invention, simplex and duplex current signals will be understood to relate to those current signals generally understood to be associated with simplex and duplex systems, respectively.

In accordance with the invention, the teleprinter exchange system includes a central transmission system and a plurality of subscribers associated therewith. A feature of the invention is that only a single communication or telegraphic line is required for connecting a subscriber with the transmission system, and particularly with the converter thereof which provides for the conversion of current pulses between the simplex and duplex forms, thereof. All signal criteria which are to be transmitted between the subscriber circuit and the transmission system are transmitted in both directions through the single connecting wire. Thus, the subscriber may transmit appropriate current pulses indicating a message through the single wire to the transmission system for transmission by the latter to remote subscribers. The converter at the central transmission system effects a polarity reversal of the subscriber circuit, thereby actuating or switching-on a teletypewriter at the subscriber circuit in response to a "connected signal," typically of continuous stopping polarity, received from the remote subscriber. The polarity reversal is effected by the converter circuit in response to the switching of a contact of a receiving relay of the transmission system which receives the connected signal from the remote subscriber. The switching of the receiving relay contact in turn effects the actuation of a contact of an additional relay provided in the subscriber circuit. As a result, the system of the invention provides for conversion of duplex and simplex signals and provides compatibility therebetween in a relatively simple, highly efficient and effective manner.

STATE OF THE PRIOR ART

Exchange systems are known in the art wherein a connection between a subscriber circuit and a transmission system in a central exchange is established through a network comprising couplers or selector switches, and in which a converter circuit is provided in the transmission system. However, in many cases the number of control lines available between a subscriber circuit and a following connection member, for example, a transmission device, is limited.

Thus, for example, if a connection network is made up of four-contact couplers it is possible to provide, in addition to a balancing line or wire, only a single telegraphic line or wire between a subscriber circuit and the converter circuit. Converter circuits are usually included in the transmission system and generally are connected to a subscriber circuit by means of two telegraph lines or wires. In accordance with prior art teachings, therefore, the converter circuit could not be employed in the described four wire network, since only a single connection line is available.

OBJECTS OF THE INVENTION

These and other objects and disadvantages of the system of the prior art are overcome by the system of the invention. In accordance with the invention, there is provided a converter circuit which is capable of converting simplex and duplex current signals, and which can be used even when there is provided only a limited number of lines or wires between a subscriber circuit and an associated transmission system.

It is therefore an object of the invention to provide a teleprinter system including means which will assure that all signal criteria can be transmitted in either direction over a single wire between a subscriber circuit and a converter circuit of the central system.

Yet another object of the invention is to provide circuit means in a teleprinter system which will assure the operation of the converter circuit in response to a connected signal received by the system from a remote subscriber.

Still another object of the invention is to provide conversion of simplex and duplex current pulses in a teleprinter system wherein the telegraphic relay associated with a teletypewriter is maintained in a stopping polarity condition prior to and during the response of the transmission system to the receipt of a connected signal from a remote subscriber.

A further object of the invention is to provide means for converting simplex and duplex signals in a teleprinter system which is of simple construction and low cost and highly efficient and effective in operation.

These and other objects of this invention will become apparent in the following detailed description of the invention.

DETAILED DESCRIPTION OF THE INVENTION

In the single FIG. of drawing, there is shown in partial schematic form, a subscriber station TN, a subscriber circuit TS, and a coupling path network WNW, which, for example, comprises a plurality of coupling relays. The FIG. further shows a converter circuit US of a transmission system or repeater Ü. The subscriber station TN comprises a receiving relay EM and a transmitting contact *sk*. The subscriber circuit TS is connected to the transmission system U through four lines or wires 1, 2, 3, and 4. The through connection of the four lines or wires 1 to 4 is accomplished by coupling contacts *k*1, *k*2, *k*3, and *k*4 of a coupling relay K.

The wire 1 is a balancing line and is connected in the subscriber station TS to a balancing resistor RN and, in the repeater or transmission system Ü, to a high resistance winding AIII of a telegraph transmitting relay A. The wire 2 is the telegraphic transmission line, and is connected, in the subscriber circuit, to a line compensating resistor RL, and, in the exchange, to the converter circuit US. There is provided an additional wire 3 which is connected to a relay U in the subscriber circuit TS. Wire 3 is not coupled to a telegraphic transmission line; however, it is possible to transmit through this wire 3 additional criteria, for example, counting pulses from the transmission system U to the subscriber circuit TS. The wire 4 is a monitoring or test wire, known as a C-wire, to which is connected the winding of coupling relay K, contact *k*4 of the latter, and the winding of a relay T.

The converter circuit US comprises two low resistance windings AI and AII of the telegraph relay A. Damping resistors R*d1* and R*d2* are connected in parallel with the windings A*i* and AII, respectively. There is further provided a holding resistor RH which, as will be explained later, serves to prevent reflection of incoming signals.

In the transmission system Ü, messages are transmitted by the operation of transmitter contact *a*, in the form of duplex current signals, to a long distance or external line (not shown) connected to terminals *a*2 and *b*2. Incoming signals are received by a receiving telegraph relay B connected to terminals *a*1, *b*1.

The operation of the converter circuit US provided in accordance with the invention will now be described. The connection of the subscriber circuit TS with the transmission system Ü is accomplished through a central control (not shown). When a subscriber wishes to establish a connection, he actuates a calling key, thereby energizing a winding (not shown) of coupling relay K. Coupling relay K remains energized in a series circuit including the relay T of the subscriber circuit TS, and its own contact *k*4, and a seizure contact *c* of the transmission system. Energization of relay K also effects closure of the additional contacts *k*1, *k*2, and *k*3, completing connections through the corresponding coupling wires 1, 2, and 3 between the transmission system Ü the subscriber circuit TS. There is further provided in the transmission system a relay UH (not shown) which at this time is not energized; as a result, its corresponding contacts *uh*1 and *uh*2 remain in the rest or open positions shown.

Due to the rest condition on the long distance line (not shown) connected to terminals *a*1 and *b*1, the receiving relay B is energized with starting polarity. Accordingly, its contact *b* is switched to the energized or closed position, as shown in the drawing. As previously mentioned, relay T in wire 4 is energized and closes its corresponding contact *t* in the transmission line 2. The telegraph relay A is energized via its high resistance winding AIII in the auxiliary line 1 by starting polarity. However, subsequently to the switching-on of the subscriber circuit TS through the circuit completed by the now actuated contact *t*, there exists an energizing circuit for the low resistance winding AI of the telegraph relay A as follows:

(1) +*TB, u, EM, sk, RL, t, k*2*, b, AI,*—TB.

As a result, the telegraph relay A is now energized with stopping polarity because the energization thereof through its winding AI predominates and thereby cancels the effect of the starting polarity energization of winding AIII. Therefore, the contact *a* is switched to its position which represents stopping polarity. As a result, stopping polarity signals representing a seizure condition are established at the long distance line (not shown) connected to terminals *a*2, *b*2. Thereupon the distance exchange transmits a return pulse to the transmission system Ü over the lines (not shown) connected to terminals *a*1, *b*1, whereby the receiving relay B is briefly energized by stopping polarity. Receiving relay B accordingly, briefly switches its corresponding contact *b* to its position representing stopping polarity, whereby the subscriber circuit TS is short-circuited. Such a short-circuiting of the subscriber circuit TS is recognized by the subscriber at station TN as a request to begin transmission.

The holding resistor RH is provided to prevent the switching of the contact *a* of the receiving relay A to its starting polarity position, during the switching of contact *b* to the stopping polarity position, because such switching of contact *a* would cause a reflection of the return pulse. Resistor RH assures that winding AI remains energized by stopping polarity during the switching period of contact *b* and that additionally winding AII will also be energized by stopping polarity.

At the end of the return pulse, contact *b* returns to its shown position and the subscriber can begin with the transmitting of dial pulses for demanding a desired, called subscriber. For this purpose the subscriber circuit is interrupted in accordance with the selected pulses or signals, whereby the telegraph relay A is switched to its starting polarity via its balancing winding AIII by each interruption of the subscriber circuit. The contact *a* transmits the dial pulses to the long distance line (not shown) connected to terminals *a*2 and *b*2 in the form of duplex current signals.

After the desired subscriber has been reached a "connected signal" indicating completion of the desired connection is received whereby the receiver relay B is energized by stopping polarity and its contact *b* is switched to its position representing stopping polarity. As a result, one end of the subscriber circuit is thereupon reversed to opposite polarity, in a manner not shown, shortly after the relay UH (not shown) provided in the transmission system Ü, is energized by receipt of the "-connected signal." The contacts *uh*1 and *uh*2 of the relay UH (not shown), when the latter is thus energized, are switched to their opposite positions. The closure of contact *uh*1 completes a circuit through wire 3 for energizing the relay U in the subscriber circuit TS. This circuit is as follows:

(2) ground, uh1, 3, k3, U, —WB

Since relay U is energized, its contact *u* is now switched to its other position, whereby the other end of the subscriber circuit is also switched to opposite polarity which, in a well-known manner, results in switching-on of the teletypewriter in the subscriber station TN.

The current in the subscriber circuit now flows through the following circuit:

(3) +TB, AII, contact b, 2, 22, t, RL, sk, EM, u, —TB

This circuit establishes the writing or information transmitting condition. During the transmission by the subscriber of station TN, the subscriber circuit is interrupted by transmitter contact *sk* in rhythm or synchronism with the teleprinter signals. With each interruption of the subscriber circuit, the stopping polarity energization of the telegraph relay A over its winding AII is terminated so that the starting polarity energization of the balancing winding AIII preponderates. As a result, the balancing current energizes the relay A in synchronism with the teleprinter signals so that its contact *a* is switched to its position representing starting polarity.

When writing in the opposite direction, i.e., upon receipt of teleprinter signals, the contact *b* will be switched to its position representing starting polarity, in synchronism with the teleprinter signals received from the distant exchange. Each switching of the contact *b* short-circuits the subscriber circuit, whereby the receiving magnet EM is deenergized. The holding resistor RH now serves to keep the telegraph relay A energized at its disconnected end during the switching of contact *b* by the incoming signals. In this condition, the energizing circuit for relay A is as follows:

(4) +TB, AII, uh2, RH, b, AI, —TB

The resistors R*d*1 and R*d*2 are provided for damping the windings AI and AII to assure the energization of the telegraph relay A also during the switching time of contact *b*.

In summary, the invention provides a highly effective and efficient system of low cost providing for conversion of simplex and duplex telegraphic signals, permitting the transmission of all criteria over a single line joining a subscriber circuit and a converter of a transmission system. The circuits of the invention also prevent any undesirable interaction or reflection of signals which would deleteriously affect or distort the transmitted signals and thus the information represented thereby.

The invention is not to be considered limited to the embodiment specifically described in conjunction with the drawings, because it will be evident that many minor changes could be made in that apparatus without departure from the scope of the invention. Accordingly, it should be realized that the invention is limited only by the appended claims.

I claim:

1. A teleprinter exchange system for converting simplex into duplex signals and including a transmission system (U,*a*,*a*2,*bal*,*bl*) for providing teleprinter communication between local and remote subscribers, comprising:

a subscriber circuit (TS) including teletypewriter apparatus switched on in response to a polarity reversal of energizing current at said subscriber circuit (TS), a single ungrounded telegraph wire (2) connecting said subscriber circuit (TS) to said transmission system (U) for transmitting all signal criteria in both directions therebetween, a converter (US) in said transmission system, said converter (US) including means (*b*) connected to said subscriber circuit solely by said single telegraph wire and operable in response to receipt by said transmission system (U,B) of a signal indicating completion of a desired connection to a remote subscriber to effect the short-circuiting of said ungrounded telegraph wire (2) and to a polarity reversal, and said subscriber circuit (TS) including means (u) responsive to the polarity reversal effected by said converter (US) to effect a corresponding polarity reversal therein for switching on the teletypewriter apparatus.

2. A teleprinter exchange system as recited in claim 1, further comprising:

actuating means (U) in said subscriber circuit (TS) for actuating said response means ($u$) thereof, a further telegraph wire (3) connecting said actuating means (U) of said subscriber circuit (US) to said transmission system (U), and said transmission system (U) including means ($uh2$) actuated in response to receipt of a connected signal for energizing said actuating means (U) of said subscriber station (TS) to effect the corresponding polarity reversal therein.

3. A teleprinter exchange system as recited in claim 1, further comprising:

a transmitting relay (A) including first and second windings (AI and AII) connected in said converter (US) for energization in corresponding, opposite polarity conditions, holding means (RH), contact means ($uh2$) movable between first and second positions for connecting said holding means (RH) in circuit with a selected one of said first and second windings (AI and AII) of said transmitting relay (A) for maintaining said transmitting relay (A) in a stopping polarity condition upon receipt by said transmission system (U) of a connected signal and until completion of the polarity reversing operation of the said converter (US).

4. A teleprinter exchange system as recited in claim 3 wherein said response means ($b$) of said converter (US) comprises a contact movable between first and second positions to complete connections between a selected one of said first and second windings (AI and AII) of said transmitting relay (A) and said single telegraph wire (2) in accordance with required polarity reversal conditions.

5. A teleprinter exchange system as recited in claim 4 wherein there is further provided:

a contact ($a$) of said transmitting relay (A) connected in said transmission system (U) and movable between first and second opposite polarity positions by said transmitting relay (A) for transmission of teletype signals, and damping means associated with each of said windings (AI and AII) of said transmitting relay (A) and having electrical values selected to delay a change in the positioning of the contact ($a$) of said telegraph relay (A) during the switching time of the polarity reversing contact ($b$) of said converter means (US).